United States Patent
Luisi et al.

(10) Patent No.: US 12,528,142 B2
(45) Date of Patent: Jan. 20, 2026

(54) PROCESS FOR MANUFACTURING A DISTRIBUTION PARTITION

(71) Applicant: APTAR FRANCE SAS, Le Neubourg (FR)

(72) Inventors: Benedicte Luisi, Evreux (FR); Julien Jeannin, Saint Jorioz (FR); Eric Lehmann, Aulnay sur Iton (FR)

(73) Assignee: APTAR FRANCE SAS, Le Neubourg (FR)

( * ) Notice: Subject to any disclaimer, the term of this patent is extended or adjusted under 35 U.S.C. 154(b) by 904 days.

(21) Appl. No.: 17/597,253

(22) PCT Filed: Jul. 1, 2020

(86) PCT No.: PCT/FR2020/051147
§ 371 (c)(1),
(2) Date: Dec. 30, 2021

(87) PCT Pub. No.: WO2021/001628
PCT Pub. Date: Jan. 7, 2021

(65) Prior Publication Data
US 2022/0314371 A1 Oct. 6, 2022

(30) Foreign Application Priority Data

Jul. 2, 2019 (FR) .................................. 1907335

(51) Int. Cl.
*B23K 26/382* (2014.01)
*B23K 26/0622* (2014.01)
(Continued)

(52) U.S. Cl.
CPC ........ *B23K 26/389* (2015.10); *B23K 26/0624* (2015.10); *B23K 26/066* (2015.10);
(Continued)

(58) Field of Classification Search
CPC .............. B32K 26/0624; B32K 26/389; B32K 26/402; B32K 26/0676; B32K 26/066; B32K 2103/42
See application file for complete search history.

(56) References Cited

U.S. PATENT DOCUMENTS 6,008,468 A * 12/1999 Tanaka ................. B23K 26/389
219/121.73
6,295,986 B1 10/2001 Patel et al.
(Continued)

FOREIGN PATENT DOCUMENTS

| EP | 1 698 399 A1 | 9/2006 |
| EP | 1 878 507 A2 | 1/2008 |
| WO | 2004/085835 A1 | 10/2004 |

OTHER PUBLICATIONS

International Search Report for PCT/FR2020/051147 dated, Nov. 2, 2020 (PCT/ISA/210).
(Continued)

*Primary Examiner* — Thien S Tran
(74) *Attorney, Agent, or Firm* — Sughrue Mion, PLLC

(57) ABSTRACT

Method for manufacturing a spray partition pierced with a network of holes through which a fluid product passes under pressure so as to be broken into fine droplets, the process comprising the following steps:
a) providing a laser source (S) able to produce a laser beam (F),
b) forming the laser beam (F) into an array of parallel partial laser beams (Fp),
c) directing the array of parallel partial laser beams (Fp) so as to strike a membrane (P0),
d) letting the array of parallel partial laser beams (Fp) strike the membrane (P0) with a view to piercing a network of holes into it (O1), so as to obtain a spray partition pierced with a network of holes,
(Continued)

Figure 6A:
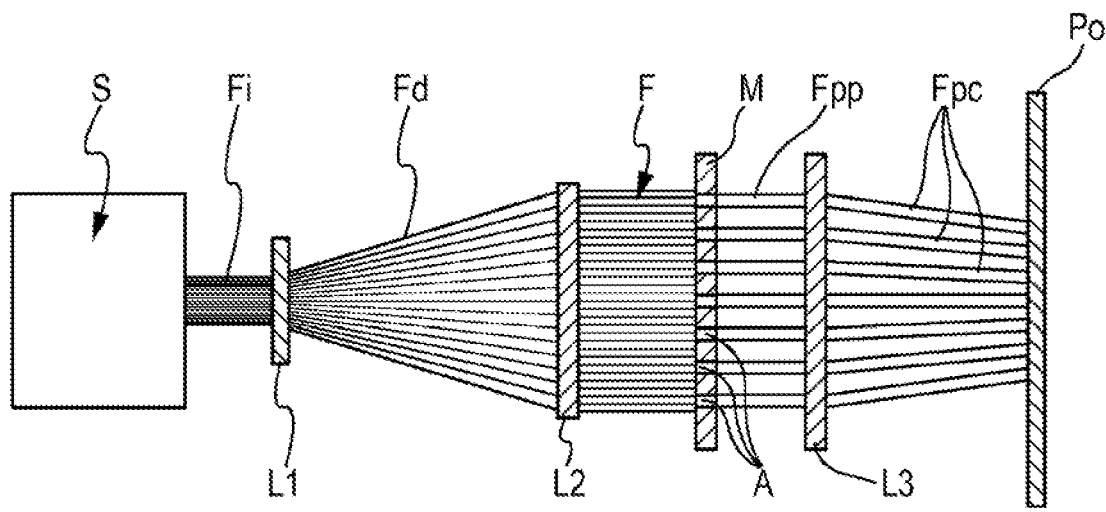

characterised in that the entirety of the holes of the spray partition are pierced, consecutively, by a plurality of arrays of partial laser beams.

23 Claims, 2 Drawing Sheets

(51) Int. Cl.
*B23K 26/066* (2014.01)
*B23K 26/067* (2006.01)
*B23K 26/402* (2014.01)
*B23K 103/00* (2006.01)

(52) U.S. Cl.
CPC ........ *B23K 26/0676* (2013.01); *B23K 26/402* (2013.01); *B23K 2103/42* (2018.08)

(56) References Cited

U.S. PATENT DOCUMENTS

| | | | |
|---|---|---|---|
| 6,313,435 B1 | 11/2001 | Shoemaker et al. | |
| 2003/0025008 A1* | 2/2003 | Srinivasan | A61M 15/0051 |
| | | | 128/200.14 |
| 2004/0188393 A1* | 9/2004 | Li | B23K 26/066 |
| | | | 219/121.7 |
| 2010/0005763 A1* | 1/2010 | Bloom | B01D 50/00 |
| | | | 55/315 |
| 2011/0240617 A1* | 10/2011 | Xu | B23K 26/38 |
| | | | 219/121.72 |

OTHER PUBLICATIONS

International Preliminary Report on Patentability dated Oct. 13, 2021 of the International Searching Authority in Application No. PCT/FR2020/051147.

* cited by examiner

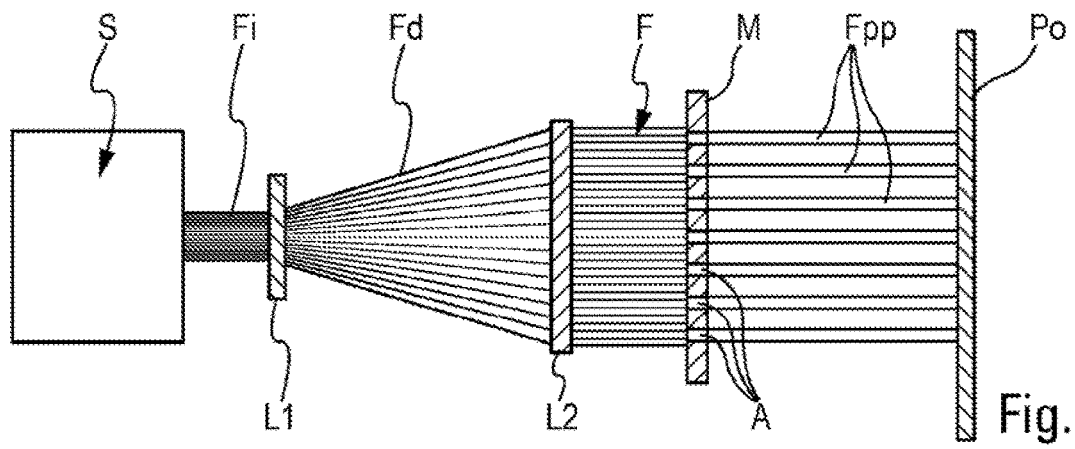
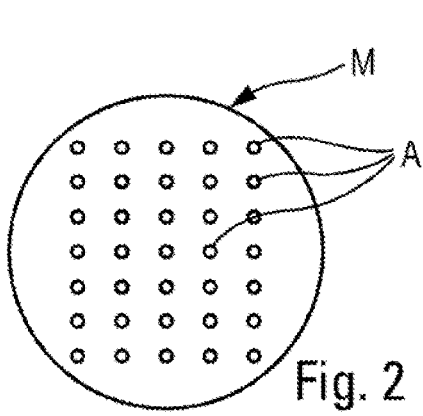
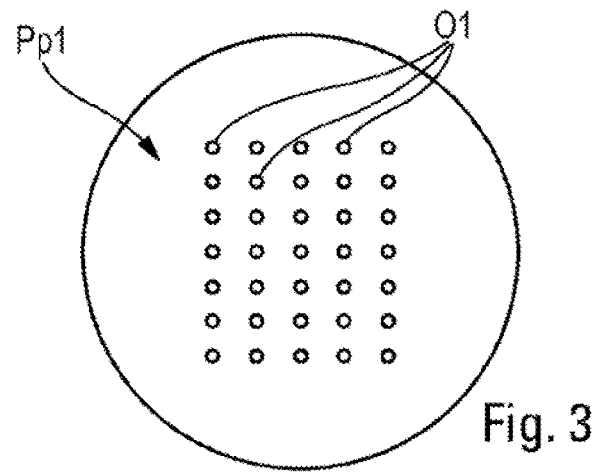
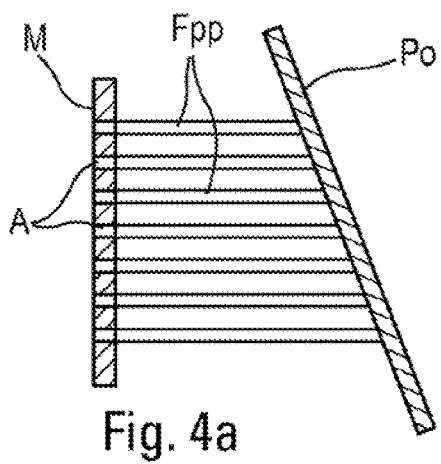
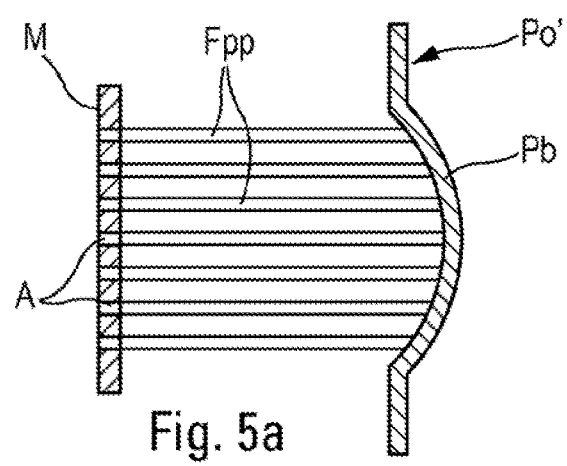
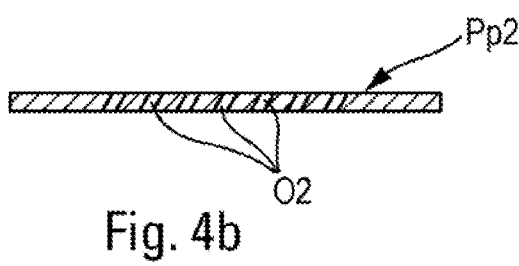
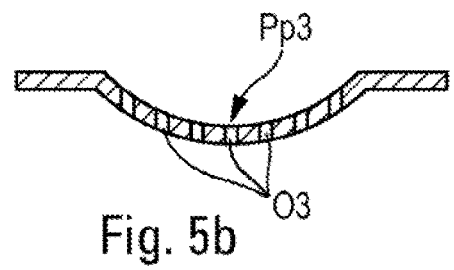

PROCESS FOR MANUFACTURING A DISTRIBUTION PARTITION

CROSS REFERENCE TO RELATED APPLICATIONS

This application is a National Stage of International Application No. PCT/FR2020/051147 filed Jul. 1, 2020, claiming priority based on French Patent Application No. 1907335 filed Jul. 2, 2019.

The present invention relates to a method of manufacturing a spray partition pierced with a network of holes through which a fluid product passes under pressure so as to be broken into fine droplets. The spray partition is generally mounted in a dispenser head that is fed with pressurised fluid by a dispenser member, such as a pump or a valve. The dispenser head may be in the form of a pusher on which a user may press by means of a finger (in general, the index finger) in order to actuate the pump or the valve so as to force the fluid through the spray partition where it will be broken into fine droplets. This type of fluid dispenser head is frequently used in the fields of perfumery, cosmetics, and pharmacy.

A conventional dispenser head, e.g. of the pusher type, comprises:
- a bearing surface on which a user may press by means of a finger, e.g. the index finger;
- an inlet well for connecting to an outlet of a dispenser member, such as a pump or a valve;
- an axial assembly housing in which there extends a pin defining a side partition and a front partition; and
- a cup-shaped nozzle comprising a substantially-cylindrical partition having an end that is closed by a spray partition that forms a spray orifice, the nozzle being assembled along an axis X in the axial assembly housing, with its cylindrical partition engaged around the pin, and its spray partition in axial abutment against the front partition of the pin.

Document EP1878507A2, describes several embodiments of a nozzle including a spray partition that is pierced with a plurality of spray holes that are substantially or completely identical in diameter, of about 1 micrometre (µm) to 100 µm, with a tolerance of 20%. Such a spray partition generates a spray having a droplet size that is relatively uniform. In an embodiment of that document, the partition is of rounded shape and the holes thus diverge. However, the cone angle of the spray remains small. This document is silent as to the technique of forming the holes.

In document EP1698399A1, the spray partition is of thickness that is constant, but of rounded shape. The holes are pierced perpendicularly to the plane of the partition, while the partition is still planar. Once the shape of the partition has been rounded, the curvature of the partition serves to make the holes diverge. It should be understood that after the partition has been rounded, the holes present sections that are constant over their entire length. In that document, it is not explained how, nor at what moment, the shape of the pierced planar partition is rounded. In the drawings, the curvature of the rounded shape is small, such that the cone angle of the spray is small. The present invention makes provision for making the holes by laser or etching.

An object of the present invention is to define a method for laser manufacture of a spray partition that is very fast and guarantees a strict identity and/or accuracy of the holes.

To achieve this object, the present invention proposes a method of manufacturing of a spray partition that comprises the following steps:
a) providing a laser source able to produce a laser beam
b) forming the laser beam into an array of partial laser beams
c) directing the array of partial laser beams so as to strike a membrane
d) letting the array of partial laser beams to strike the membrane with a view to piercing a network of holes into it, so as to obtain a spray partition pierced with network of holes, characterised in that the entirety of the holes of the spray partition may be pierced consecutively by a plurality of arrays of partial laser beams, advantageously coming from a single laser source.

Advantageously, step b) comprises directing the laser beam onto a mask able to block or absorb a portion of the laser beam and to allow another portion of the laser beam to pass or be reflected in the form of the array of partial laser beams. The mask may be in the form of a mesh or a grid, or even in the form of a partially reflective mirror. The precision of the mask will strongly influence the identity of the holes pierced in the membrane.

According to one embodiment, several series of holes may be made consecutively with masks, the number of holes per series being less than about 30, advantageously about 20 and preferably about 10. The fewer holes there are in each series, the less powerful the laser beam needs to be. Moreover, the quality of the piercing is better with a small number of holes, since they may be spaced further apart from each another. Two nearby holes are affected by a large amount of energy concentrated within a small area.

Advantageously, at least one of the masks of one series is different from the masks of the other series. Thus, it is possible to sub-divide a total network of holes into complementary sub-networks, which may be identical or different. This allows the holes pierced to be moved away from each other simultaneously to ensure their quality. The holes pierced simultaneously may be spaced at least 20 µm apart from each other and preferably about 70 µm apart, or even 100 to 200 µm apart.

According to another characteristic of the invention, the spray partition may be made of polymeric material, preferably PP or PBT, and may have a thickness of 50 to 250 µm, preferably 90 to 150 µm.

According to a very interesting characteristic, the laser beam has a wavelength within the infra-red range, of between 950 and 1100 nm, advantageously about 1030 nm.

Moreover, the laser beam may have a pulse duration of less than 10 picoseconds, advantageously about 0.26 picoseconds.

It should be observed that the wavelength of 950 nm and 1100 nm and/or the pulse duration of less than 10 picoseconds for the laser beam are characteristics which may be implemented independently of the fact of piercing with the laser by implementing a plurality of arrays of partial laser beams leading to several series of holes pierced consecutively with identical or different complementary masks. Individual protection could be sought for each of these two characteristics, or for a combination of these two characteristics.

The partial laser beams are advantageously parallel, but they may also be convergent or divergent by arranging, for example, a convergent or divergent lens between the mask and the membrane to be pierced.

According to a simple embodiment, the membrane is at least locally planar and may extend perpendicularly to the partial laser beams. Each partial laser beam may thus strike the membrane in an identical manner. It is also possible to modulate each partial laser beam in different ways.

According to a more complex embodiment, the membrane is at least locally planar and may extend obliquely relative to the partial laser beams.

According to another complex embodiment, the membrane is of rounded shape and has an axis or a plane of symmetry which may be parallel to or coincident with the partial laser beams. The term "of rounded shape" includes all forms that are not entirely planar, such as convex or concave domes, cones, pyramids, bends, folds, etc.

In addition, the membrane may be deformed before piercing. Alternatively or cumulatively, the spray partition may be deformed after piercing.

According to a basic embodiment, the entirety of the holes of the spray partition may be pierced simultaneously by an array of partial laser beams coming from a single laser source.

According to a more complex embodiment, the entirety of the holes of the spray partition may be pierced, advantageously simultaneously, by a plurality of arrays of partial laser beams coming respectively from a plurality of laser sources. Thus, it is possible to pierce a first series of holes with a given inclination and/or size, and a second series of holes with another inclination and/or size. Depending on the network of holes that it is desired to obtain, either one laser source or a plurality of laser sources will be used.

In order to obtain an optimal spray in the fields of perfumery, cosmetics and pharmacy, the holes may have a flow section of about 0.5 to 700 $\mu m^2$, advantageously 10 to 300 $\mu m^2$, and preferably 50 to 200 $\mu m^2$. In addition, the network of holes may have a combined flow section of about 1000 to 20,000 $\mu m^2$, advantageously 3000 to 8,000 $\mu m^2$ and preferably 3500 to 6500 $\mu m^2$. It should be observed that these selections of flow section values (of each hole and of the set of holes) are characteristics which may be implemented independently of the method of manufacturing the spray partition. They may therefore be protected per se, possibly in the context of a pusher mounted on a pump, or a valve.

The scope of the invention is based on masking, dividing, filtering or splitting a laser beam in order to create a plurality of partial beams which are parallel to each other and will strike a perpendicular or sloping planar membrane and/or a membrane of rounded shape with a view to piercing holes into it for spraying a fluid product.

The invention will now be described in more detail with reference to the accompanying drawings, which show several embodiments of the invention as non-limiting examples.

Figure 6B:
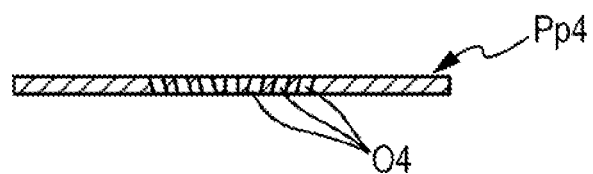
Figure 7A:
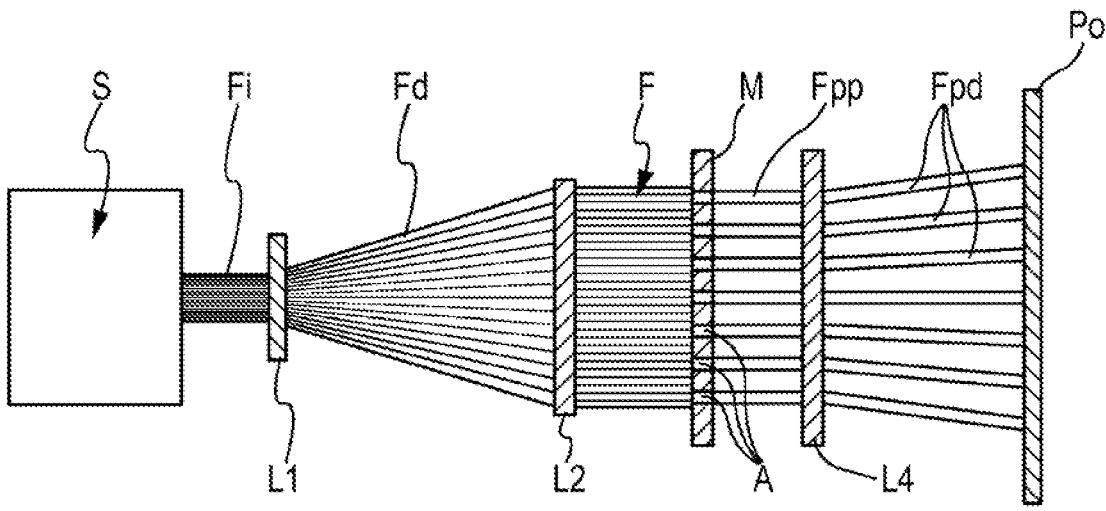
Figure 7B:
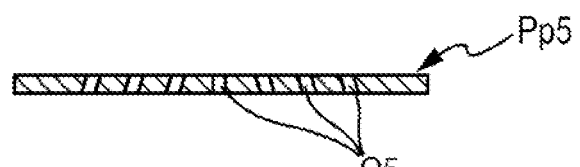

In the figures:

FIG. 1 is a schematic, perspective view showing a method of laser micro-piercing according to a first embodiment of the invention, FIG. 2 is a plan view of the mask used during the method of laser micro-piercing mentioned in FIG. 1, FIG. 3 is a plan view of the spray partition obtained by micro-piercing a membrane;

FIG. 4*a* is a very diagrammatic view showing a membrane which is arranged at an angle to the laser beams;

FIG. 4*b* is a horizontal cross-section view through the spray partition resulting from the laser micro-piercing of the membrane in FIG. 4*a*, FIG. 5*a* is another very diagrammatic view showing a membrane of rounded shape struck by laser beams, FIG. 5*b* is a horizontal cross-section view through the spray partition resulting from the laser micro-piercing of the membrane in FIG. 5*a*, FIG. 6*a* is a view similar to the view in FIG. 1, showing a second embodiment of the invention, FIG. 6*b* is a horizontal cross-section view through the spray partition resulting from the laser micro-piercing of the membrane in FIG. 6*a*, FIG. 7*a* is a view similar to the view in FIG. 1 for a third embodiment of the invention, FIG. 7*b* is a horizontal cross-section view through the spray partition resulting from the laser micro-piercing of the membrane in FIG. 7*a*, Reference is made firstly to FIG. 1 in order to explain in detail the laser micro-piercing system for piercing micro-holes in a P0 membrane, the characteristics of which are given below. The micro-piercing system comprises firstly a laser source S able to produce an initial laser beam Fi which is directed towards a mask M, which is an essential element of the invention. The initial beam Fi may directly reach the mask M. In a variant shown in FIG. 1, the initial beam Fi may initially pass through a first diverging lens L1 so as to obtain a divergent beam Fd which then passes through a convergent lens L2 so as to obtain an enlarged parallel laser beam F which will strike the mask M. Although not shown, the laser beams between the source S and the mask M may still be deflected by means of the mirrors. The function of the mask M is to form the laser beam F into an array of partial laser beams Fpp which are parallel to each other in this embodiment. The mask M may be in the form of a mesh or a grid defining passage openings A for a portion of the laser beam F. The mask M may be made of any appropriate material. It may be in the form of a dynamic modulator. In FIG. 1, the mask M is a through mask, in the sense that the laser beam F passes through the mask M. In a variant (not shown), the mask could also be of the reflective or mirror type, reflecting only a portion of the laser beam F. The mask M is fixed during the laser micro-piercing operation. In a variant, it is possible to move the mask M in order to produce holes of complex shapes in the membrane P0. Whatever the type of mask, an array of parallel partial laser beams Fpp is created, which will strike the membrane P0 in order to pierce micro-holes O1 into it.

FIG. 2 shows the mask M with its passage openings A, which in this case are round: they could, however, have another shape, e.g. square, triangular, oval or slotted.

FIG. 3 shows the spray partition Pp which results from micro-piercing the membrane P0. A network of holes O1 can be seen that is strictly identical to the network of passage openings A of the mask M.

In FIG. 1, it should be observed that the membrane P0 is planar and extends perpendicularly to the parallel partial beams Fpp. Thus, the holes O1 correspond in size and arrangement to the array of parallel partial laser beams Fpp coming from the mask M, whenever it is fixed.

FIG. 4*a* shows the mask M with its passage openings A, from which starts an array of parallel partial laser beams Fpp that are identical to that of FIG. 1. In contrast, the membrane P0 is not arranged perpendicularly to the parallel partial beams Fpp, but, on the contrary, obliquely or in a sloping manner, so that the micro-holes O2 thus pierced extend in a sloping manner in the spray partition Pp2, visible in FIG. 4*b*.

FIG. 5*a* once again shows the mask M in FIGS. 1 and 4*a*, from which a network of parallel partial beams Fpp comes which strikes a membrane P0', that comprises a central part of rounded shape Pb. The membrane P0' is orientated in such a way that the axis of symmetry of the part of rounded shape Pb is parallel to or coincident with the parallel partial laser beams Fpp. Finally, a spray partition Pp3 with parallel holes O3 is obtained, as may be seen in FIG. 5*b*.

FIG. 6*a* shows a laser micro-piercing system that differs from that of FIG. 1 in that a convergent lens L3 is arranged between the mask M and the membrane P0 to be pierced. Thus, the parallel partial laser beams Fpp coming from the mask M are deflected in a convergent manner as they pass through the convergent lens L3, so as to obtain an array of convergent partial laser beams Fpc, which will strike the membrane P0 in a sloping manner. Thus, a spray partition Pp4 with convergent holes that slope O4 is obtained, as can be seen in FIG. 6*b*. Only the central hole is made perpendicular to the plane of the spray partition Pp4.

FIG. 7*a* is a variant embodiment of FIG. 6*a*, in which the convergent lens L3 has been replaced by a diverging lens L4, so as to obtain an array of divergent partial laser beams Fpd, which will impact the membrane P0 so as to pierce sloping holes into it, as can be seen in FIG. 7*b*, which illustrates a spray partition Pp5 pierced with divergent holes O5.

Thus, the various embodiments make it possible to pierce micro-holes O1, O2, O3, O4, O5 in a membrane that is planar or profiled, for example of rounded shape. The membrane may be arranged perpendicularly to the partial laser beams, as is the case in FIG. 1, or in a sloping manner, as in FIG. 4*a*.

The partial beams may be parallel, like the Fpp of FIGS. 1, 4*a* and 5*a*, or convergent like the Fpc of FIG. 6*a* or divergent like the Fpd of FIG. 7*a*.

During the laser micro-piercing operation, the membrane is maintained in a fixed and constant state. However, it may be deformed before or after the step of laser micro-piercing. For example, the spray partition Pp1 may be of rounded shape after micro-piercing. The spray partition Pp3 may be flattened or deformed symmetrically after micro-piercing. The same applies for the spray partitions Pp4, Pp5, which may be profiled before or after piercing.

The membrane P0 or P0' may, for example, be made of metal, such as stainless steel. It is also possible to envisage making the membrane out of plastic or a mixture of plastics. It is also possible to produce the membrane in the form of a laminate, comprising, for example, one or more layers of metal and one or more layers of plastic. The membrane may also be made of silicon.

The type of laser source S depends on the size of the holes which are to be made. For holes from 1 to 20 μm, a fixed percussion laser will be preferred. For holes greater than 20 μm, a rotary laser by trephination will be preferred.

The wavelength of the light radiation may be arbitrary: it must be adapted as a function of the quality of the piercing and the material. For example, for piercing stainless steel, it is recommended to use a laser source which generates IR light radiation at a wavelength of between 950 and 1100 nm. The optimum pulse duration should be less than 10 picoseconds and preferably about 0.26 picoseconds. The pulse rate is 0.1 to 70 kHz. The stability of the pointing θ<50 μrad. The energy required is 1 to 50 mJ. This depends on the number of holes, the thickness of the surface and the number of pulses. For example, to produce 50 holes between 10 and 15 μm, an energy of between 3 and 35 mJ is required.

The thickness of the spray membrane/partition where the holes are formed is about 10 to 500 μm, and advantageously about 30 to 100 μm. The thickness of the spray membrane/partition is preferably constant, but a thickness that varies may also be envisaged. The diameter of the spray partition Pp, where the holes are formed, is about 0.3 to 5 mm. The diameter of the holes is about 1 to 100 μm, advantageously about 10 to 30 μm, and preferably about 5 to 20 μm. Still more generally, the holes may have a passage cross-section of about 0.5 to 700 μm$^2$, advantageously 10 to 300 μm$^2$ and preferably 50 to 200 μm$^2$. The network of holes in a spray partition may have a combined flow section of about 1000 to 20,000 μm$^2$, advantageously 3000 to 8,000 μm$^2$, and preferably 3500 to 6500 μm$^2$. By way of example, it is possible to provide 50 holes of 10 to 12 μm$^2$ or 20 holes of 20 μm$^2$ or 80 holes of 8 μm$^2$ or even 300 holes of 6 μm$^2$. According to a preferred embodiment, a spray partition, having for example a diameter of about 1 mm, may be pierced with 30 to 60 holes having a diameter of about 8 to 20 μm, for example half with a diameter of 9 μm and the other half with a diameter of 16 μm. The density of holes per mm$^2$ is about 40 to 80. Advantageously, not all of the holes are pierced at the same time with a single mask, but in consecutive series comprising a maximum of about 30 holes per series. It is even preferable to reduce the number of holes to about 20, and preferably to about 10. The term "about" must be understood as a tolerance of about 10%. Each series of holes uses a mask which may be identical, or, on the contrary, different. All of the masks may be different from each other or different per pair. Only one of the masks may be different from the others which are otherwise all identical. It is also possible to use a dynamic mask whose passage/blocking pattern may be modified. Moreover, the holes of a series, which are therefore pierced simultaneously, are spaced at least 20 μm apart from each other and preferably about 70 μm apart. However, a distance of 100 to 200 μm is possible.

By means of the IR laser micro-piercing process according to the invention, it is possible to manufacture spray partitions of any shape with parallel, sloping, diverging or converging micro-holes. All of the holes of the spray partition may be made simultaneously by means of a single laser micro-piercing system. In a variant, the holes may be made in a plurality of laser micro-piercing operations, by means of one or two laser micro-piercing system(s) and a single mask or a plurality of different masks. A series of holes may be made at the same time as another series of holes, or, on the contrary, the series of holes in question may be made consecutively. The entirety of the holes may have an identical configuration, e.g. cylindrical or frustoconical. In a variant, two series of holes of different sizes and/or configurations can be provided.

The invention claimed is:

1. A method of manufacturing a spray partition (Pp1; Pp2; Pp3; Pp4; Pp5) pierced by a network of holes (O1; O2; O1; O2; O3) through which a fluid product passes under pressure so as to be broken into fine droplets, the process comprising the following steps:
   a) providing a laser source (S) able to produce a laser beam (F),
   b) forming the laser beam (F) into an array of parallel partial laser beams (Fpp; Fpc; Fpd) that are parallel,
   c) directing the array of partial laser beams (Fpp; Fpc; Fpd) so as to strike a membrane (P0; P0'),
   d) letting the array of partial laser beams (Fpp; Fpc; Fpd) strike the membrane (P0; P0') to pierce a network of holes in the membrane (O1; O2; O3; O4; O5), so as to obtain a spray partition (Pp1; Pp2; Pp3; Pp4; Pp5) pierced with network of holes (O1; O2; O3; O4; O5), wherein an entirety of the network of holes (O1; O2; O3; O4; O5) of the spray partition (Pp1; Pp2; Pp3; Pp4; Pp5) are obtained by consecutively piercing by a plurality of the array of partial laser beams;

wherein several series of the network of holes are made consecutively with masks; and
wherein at least one of the masks of one series is different from the masks of the other series.

2. The method according to claim 1, wherein step b) comprises directing the laser beam (F) onto at least one mask (M) configured to block or absorb a portion of the laser beam (F) and to allow another portion of the laser beam (F) to pass or be reflected as the array of partial laser beams (Fpp; Fpc; Fpd).

3. The method according to claim 2, wherein the number of holes (O1; O2; O3; O4; O5) per series being less than about 30.

4. The method according to claim 1, wherein the holes (O1; O2; O3; O4; O5) pierced simultaneously are spaced apart from each other by at least 20 μm.

5. The method according to claim 1, wherein the laser beam (F) has a wavelength of 950 nm to 1100 nm.

6. The method according to claim 1, wherein the laser beam has a pulse duration of less than 10 picoseconds.

7. The method according to claim 1, wherein the spray partition (Pp1; Pp2; Pp3; Pp4; Pp5) is made from a polymeric material and has a thickness from 50 to 250 μm.

8. The method according to claim 1, wherein the partial laser beams (Fpp) are parallel, convergent or divergent.

9. The method according to claim 1, wherein the membrane (P0) is at least locally planar and extends perpendicularly to the partial laser beams (Fpp; Fpc; Fpd).

10. The method according to claim 1, wherein the membrane (P0') is of rounded shape and has an axis or plane of symmetry that is parallel to or coincident with the partial laser beams (Fpp).

11. The method according to claim 1, wherein the spray partition (Pp1; Pp2; Pp3; Pp4; Pp5) is deformed after piercing.

12. The method according to claim 1, wherein the holes (O1; O2; O3; O4; O5) have a flow section of about 0.5 to 700 μm$^2$.

13. The method according to claim 1, wherein the network of holes (O1; O2; O3; O4; O5) has a combined flow section of about 1,000 to 20,000 μm$^2$.

14. The method according to claim 1, wherein the holes (O1; O2; O3; O4; O5) has a density per mm$^2$ of about 40 to 80.

15. The method according to claim 3, wherein the number of holes is less than about 20.

16. The method according to claim 3, wherein the number of holes is less than about 10.

17. The method according to claim 1, wherein the holes pierced simultaneously are spaced apart from each other by at least about 70 μm.

18. The method according to claim 1, wherein the spray partition is made from PP or PBT, and has a thickness from 90 to 150 μm.

19. The method according to claim 1, wherein the holes have a flow section of 10 to 300 μm$^2$.

20. The method according to claim 1, wherein the network of holes has a combined flow section of 3000 to 8,000 μm$^2$.

21. A method of manufacturing a spray partition pierced by a network of holes through which a fluid product passes under pressure so as to be broken into fine droplets, the process comprising:
 a) providing a laser source that produces a laser beam,
 b) forming the laser beam into an array of partial laser beams that are parallel by directing the laser beam onto a mask configured to block or absorb a portion of the laser beam and to allow another portion of the laser beam to pass or be reflected in the form of the array of partial laser beams,
 c) directing the array of partial laser beams so as to strike a membrane,
 d) striking the membrane with the array of partial laser beams to pierce a series of holes in the membrane,
 wherein an entirety of the network of holes of the spray partition are obtained by consecutive series of holes by a plurality of arrays of partial laser beams; and
 wherein said step of forming the laser beam into an array of partial laser beams that are parallel by directing the laser beam onto a mask is repeated using a plurality of different masks, each of the plurality of different masks defining a different array of holes.

22. The method according to claim 2, wherein the number of holes per series is set so as to increase the space between two holes in the same series of holes without reducing the final density of holes in the spray partition.

23. The method according to claim 22, wherein the number of holes per series is less than 30.

* * * * *